Figure 1:
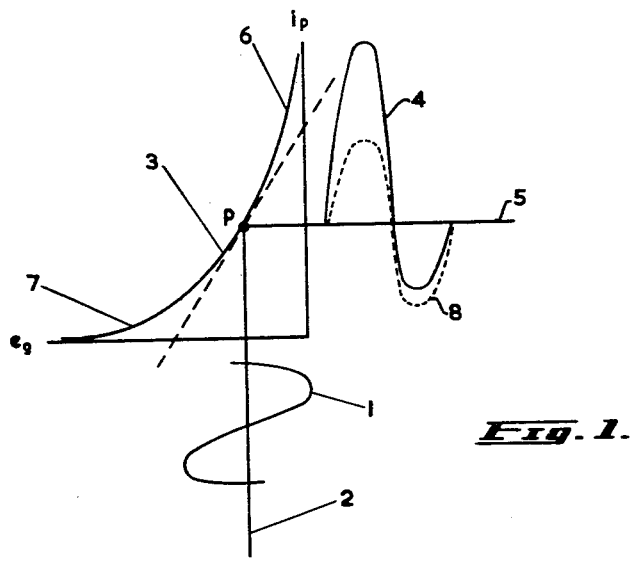

Sept. 12, 1961　　　G. W. HOLBROOK　　　2,999,986
METHOD OF CORRECTING NON-LINEAR DISTORTION
Filed Dec. 13, 1957　　　　　　　　　7 Sheets-Sheet 1

INVENTOR.
George W. Holbrook
BY Ralph B. Stewart

Sept. 12, 1961    G. W. HOLBROOK    2,999,986
METHOD OF CORRECTING NON-LINEAR DISTORTION
Filed Dec. 13, 1957    7 Sheets-Sheet 2
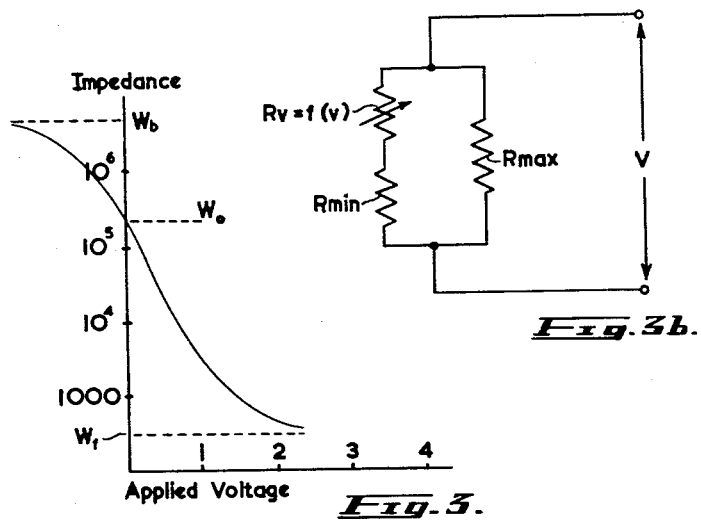
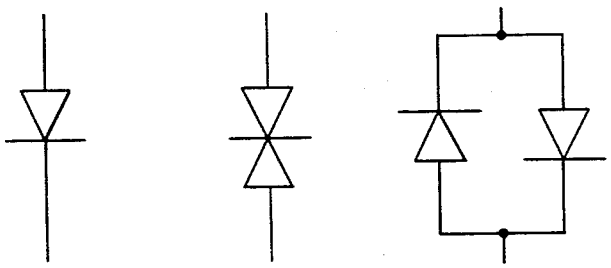
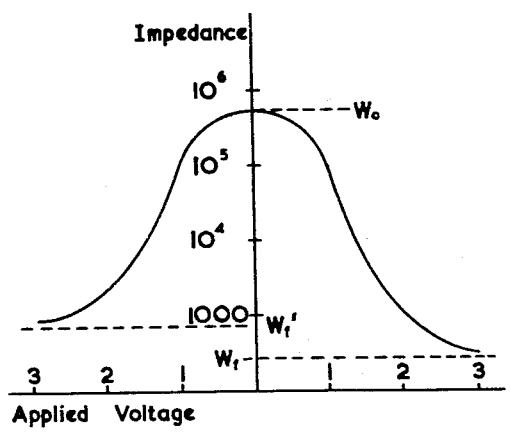
INVENTOR.
George W. Holbrook
BY Ralph B. Stewart Sept. 12, 1961  G. W. HOLBROOK  2,999,986
METHOD OF CORRECTING NON-LINEAR DISTORTION
Filed Dec. 13, 1957  7 Sheets-Sheet 4

INVENTOR.
George W. Holbrook
BY Ralph B. Stewart

INVENTOR.
George W. Holbrook
BY Ralph B. Stewart

United States Patent Office 2,999,986
Patented Sept. 12, 1961

2,999,986
METHOD OF CORRECTING NON-LINEAR DISTORTION
George William Holbrook, Kingston, Ontario, Canada, assignor to Her Majesty the Queen in the Right of Canada as represented by the Minister of National Defence
Filed Dec. 13, 1957, Ser. No. 702,595
11 Claims. (Cl. 330—149)

This invention relates to a circuit for compensating for non-linear distortion in a vacuum tube.

Non-linear distortion in a vacuum tube amplifier results in the amplifier output containing harmonics which are not present in the amplifier input. Such distortion arises because the dynamic transfer characteristic of the tube is not linear over the operating range of the input signal, the dynamic transfer curve being the curve representing the relationship between grid voltage and plate current, for a predetermined value of plate supply and plate load.

For a triode tube, the dynamic characteristic is such that the slope of the transfer curve becomes greater for positive values and smaller for negative values of input voltage even over what is normally called the linear portion of the characteristic. For pentode tubes under certain conditions of anode loading, the slope of the transfer curve may decrease for both positive and negative input signals.

In practice, the amount by which the transfer curve deviates from a straight line will generally be greater for negative input signals than it is for positive input signals. The degree of deviation will also be a function of the amplitude of the signal.

It is an object of the present invention to devise a circuit for substantially compensating for the distortion introduced into a signal by such non-linear transfer characteristics.

In particular, it is an object of the invention to devise a circuit for predistorting a signal before applying it to a vacuum tube, whereby such predistortion substantially compensates for the effect of the non-linearity of the tube's transfer characteristic.

In order to compensate for the effect of such non-linear transfer characteristics, the present invention proposes to feed the input signal through a network having an impedance which is dependent upon polarity and amplitude of the input signal, before applying the signal to the grid of the tube in question. This network includes non-linear circuit elements and has an impedance characteristic which is complementary to the transfer characteristic of the tube. It may be placed in circuit immediately before the grid of the tube, or may be inserted in a stage of amplification prior to the one being corrected.

Figure 2:
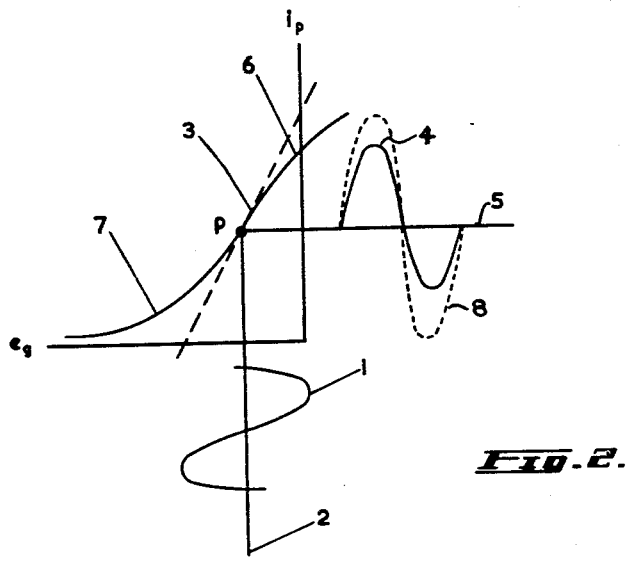
Figure 4B:
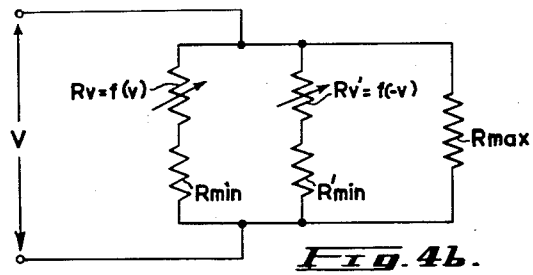
Figure 5:
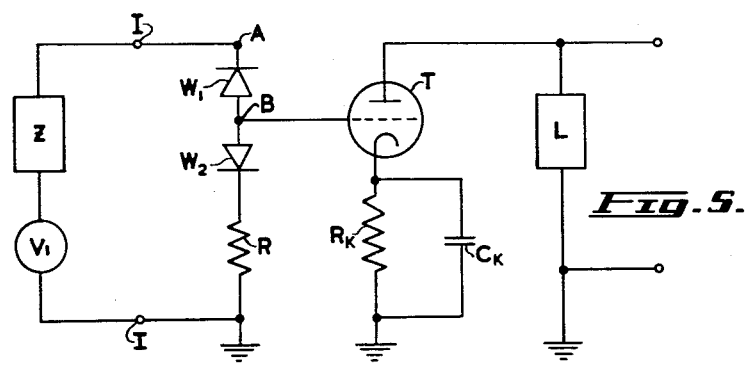
Figure 5A:
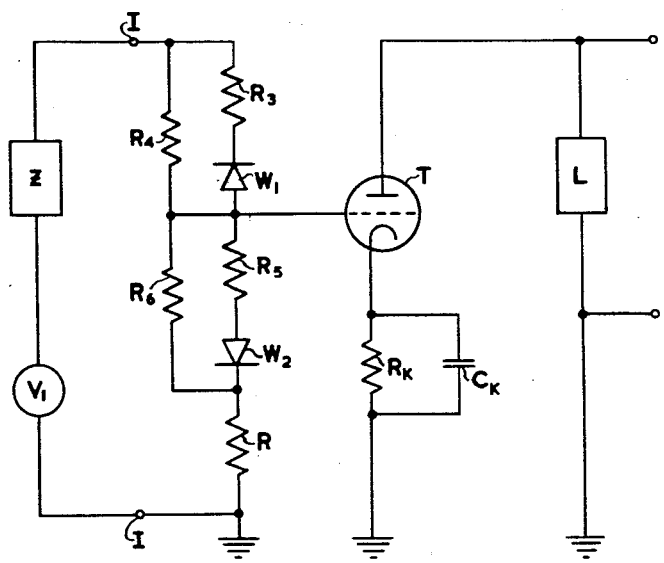
Figure 6:
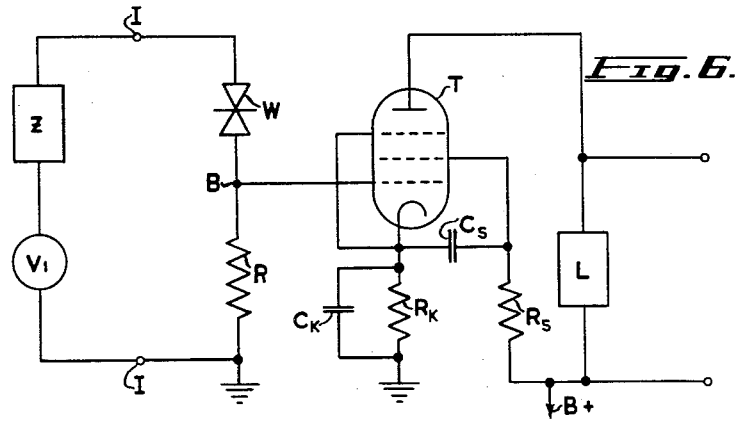
Figure 6A:
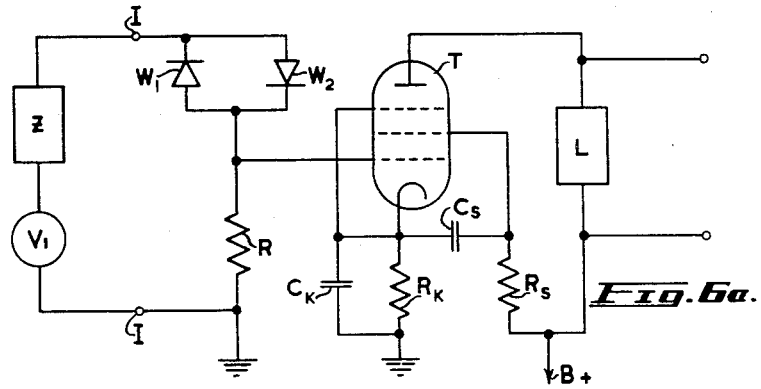
Figure 6B:
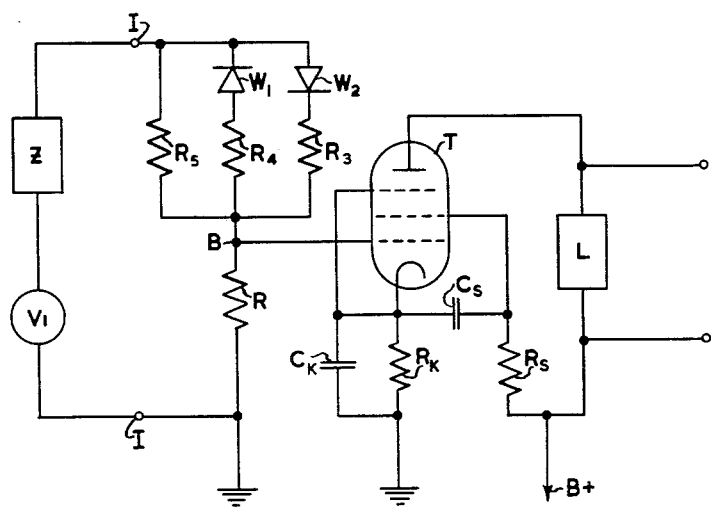
Figure 7:
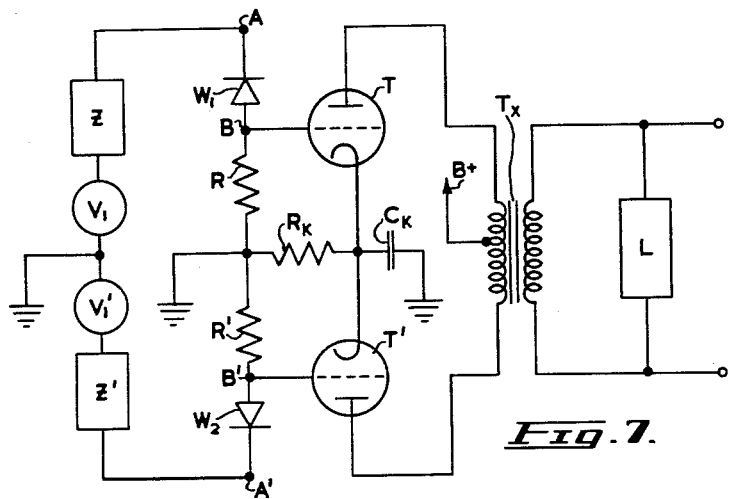
Figure 7A:
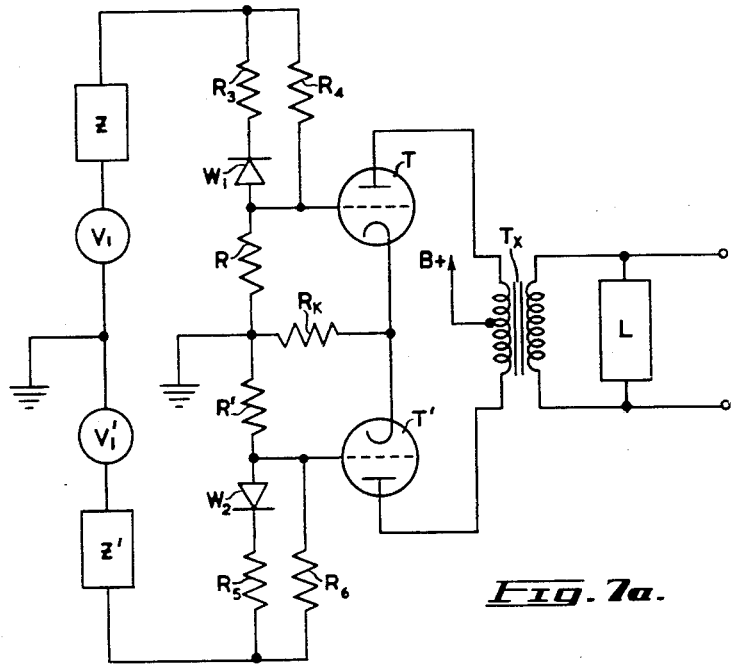
Figure 7B:
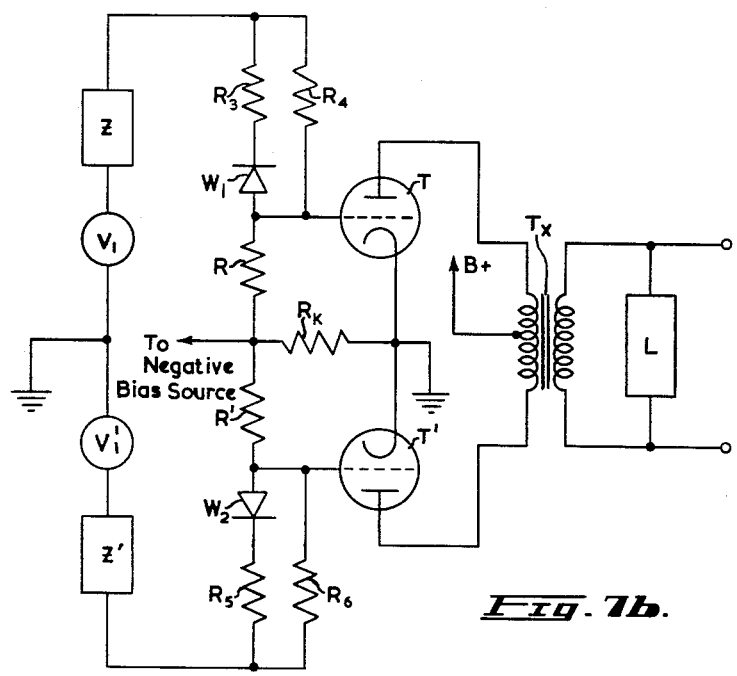
Figure 8:
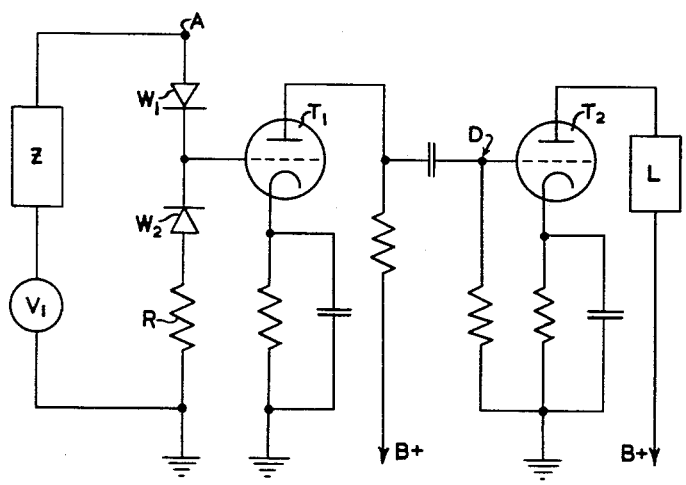
Figure 9:
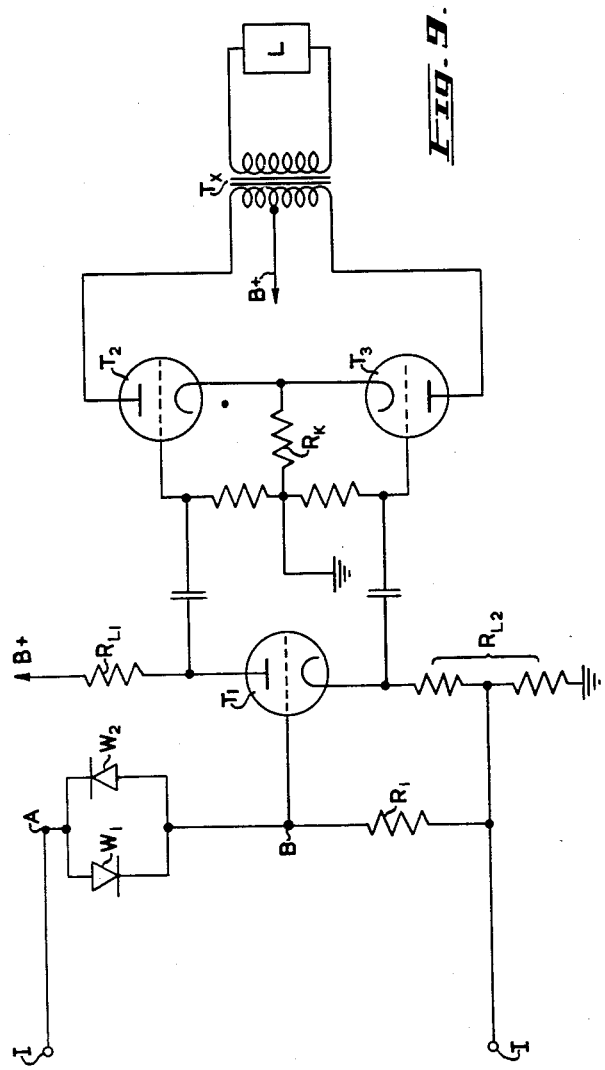

The invention will now be described in detail with reference to the accompanying drawings in which:

FIGURE 1 illustrates the dynamic characteristic of a typical triode and the input and output waveforms thereof, FIGURE 2 illustrates the dynamic characteristic of a typical pentode and the input and output waveforms thereof, FIGURE 3 illustrates the resistance characteristic of a non-symmetrical varistor the circuit representation of which is shown in FIGURE 3a and whose equivalent circuit is shown in FIGURE 3b, FIGURE 4 illustrates the resistance characteristic of a symmetrical varistor, the circuit representation of which is shown in FIGURE 4a and whose equivalent circuit is shown in FIGURE 4b, FIGURE 4c shows two unsymmetrical varistors connected in opposing directions, FIGURE 5 is a schematic diagram of a single stage triode amplifier to which a compensating network according to the present invention has been applied, FIGURE 5a shows a modification of the circuit shown in FIGURE 5, FIGURE 6 is a schematic diagram of a single stage pentode amplifier to which a compensating network according to the present invention has been applied, FIGURES 6a and 6b, show modifications of the circuit shown in FIGURE 6, FIGURE 7 is a schematic diagram of a push-pull amplifier to which a compensating network according to the present invention has been applied, FIGURES 7a and 7b show modifications of the circuit shown in FIGURE 7, FIGURE 8 is a schematic diagram of a two stage triode amplifier in which a network compensating for distortion in the second tube has been applied prior to the first tube, and FIGURE 9 is a circuit in which the non-linearity of a push-pull stage is corrected by a network prior to the preceding phase splitter.

The distortion of output waveform due to curvature of the dynamic characteristic, as discussed above, is illustrated in FIGURE 1. The input wave 1 is symmetrical about its axis 2 which intersects the dynamic characteristic 3 at P, the operating point. The resultant output waveform 4 is not symmetrical about its axis 5 since the excursion of input waveform 1 causes operation into the curved portions 6 and 7 of the dynamic transfer curve 3.

The shape of the upper and lower lobes of the output waveform 4 differs from those which would be obtained if the transfer characteristic were a straight line. The Fourier analysis of such an unsymmetrical waveform shows that the output contains harmonic frequencies of the input frequency. For comparison, the output for a linear characteristic is shown in broken outline at 8.

In FIGURE 2, the slope of the dynamic characteristic 3 of the pentode tube decreases for both positive and negative signal voltages producing the output waveform shown and again resulting in harmonics. Similar numbers are used in FIGURES 1 and 2 to indicate similar features. In all cases where non-linearity exists in a transfer characteristic, intermodulation products will be produced if two signals are simultaneously applied to the grid. The amplitude of these intermodulation products will increase as the transfer characteristic departs increasingly from the form of a straight line.

It will therefore be seen that in both the triode and pentode, the transfer characteristic's deviation from linearity depends first upon the input signal's polarity relative to the grid bias, and is normally greater for negative polarity, and secondly upon the amplitude of the input signal, the deviation increasing with amplitude.

In devising a circuit according to the present invention having an impedance characteristic complementary to the tube's transfer characteristic, use is made of non-linear impedance elements such as thermionic diodes and varistors. The latter are used in the preferred embodiments to be described later but the application of thermionic diodes to similar circuits will be obvious to those skilled in the art.

A varistor is a two electrode semiconductor device having a voltage dependent non-linear resistance. The term varistor includes all types of unsymmetrical non-linear semi-conductor devices such as copper oxide, selenium, germanium and silicon rectifiers, as well as symmetrical non-linear semi-conductors such as silicon carbide.

FIGURE 3 illustrates the resistance characteristic of an unsymmetrical varistor, its diagrammatic representation being shown in FIGURE 3a. From FIGURE 3 it will be apparent that the resistance of the element depends both on the polarity and amplitude of the applied voltage and varies over a wide range for small changes of applied voltage. With positive voltages, the minimum or forward resistance Wf is quite low. For applied voltages approaching zero in value, the resistance, Wo, may be of the order of one thousand times as great as Wf. For negative voltages, the back resistance, Wf, may be ten times as great as Wo.

The equivalent circuit of an unsymmetrical varistor, shown in Figure 3b, comprises a resistance R max substantially equal to the back resistance Wb and in parallel with the series combination of a resistance R min substantially equal to forward resistance Wf and a resistance Rv which is variable between zero and infinity depending on the value and polarity of the applied voltage, and being substantially equal to Wo for voltages approaching zero.

FIGURE 4 shows the resistance characteristic which is obtained with a natural symmetrical varistor or by connecting two similar unsymmetrical varistors in opposing directions as shown in FIGURE 4c. In FIGURE 4 the forward resistance in one direction is indicated as Wf, the resistance in the reverse direction is Wf' and the resistance at zero applied voltage is Wo. The equivalent circuit of the natural symmetrical varistor or the two opposed unsymmetrical varistors, as shown in FIGURE 4b comprises three parallel arms, one containing a resistance R max substantially equal to Wf, a second containing the series combination of resistances Rv and R min and the third containing the series combination of resistances Rv' and R min. R min is substantially equal to reverse resistance Wf, R' min is substantially equal to Wf' while Rv and Rv' are related to Wo as $$Wo = \frac{Rv \cdot R'v}{Rv + R'v}$$

for voltages approaching zero.

It will be appreciated that for a given varistor the values of R min and R max can be changed by adding external resistors in either a shunt or series fashion to the original varistor.

Having described and illustrated the dynamic characteristics of triodes and pentodes as well as the resistance characteristics of unsymmetrical and symmetrical varistors, it will now be shown how such varistors may be utilized in a circuit to compensate for the undesirable non-linearity of said tube characteristics.

In FIGURE 5, a triode T is shown connected in the normal grounded cathode configuration, its output being taken at terminals O across load L. Bias in this case is provided by means of the autobias resistor Rk decoupled by the capacitor Ck. It should be appreciated, however, that other methods of biasing, including battery bias, may also be applied.

The grid of the tube is connected to point B of a potential divider comprising two unsymmetrical varistors W1 and W2, and the resistor R, the varistors being connected back to back. The input to the circuit across I—I is represented by a generator of voltage V1 and internal impedance Z.

On application of an A.C. signal to the input terminals I, point A becomes alternately positive and negative with respect to ground. When A is approaching zero voltage with respect to ground, W1 and W2 will achieve their middle values of resistance (designated $R1_0$ and $R2_0$ in value).

Under these conditions, the attenuation of the network can be expressed by $$V2 = V1\left(\frac{R + R2_0}{Z + R + R2_0 + R1_0}\right) \quad \text{Equation 1}$$

where V2 is the voltage appearing between ground and point B.

When A is positive with respect to ground, W2 achieves its lowest value of resistance R2 min and W1 rises to its maximum value of resistance, R2 max. Under these condition, the attenuation of the network can be expressed by $$V2 = V1\left(\frac{R + R2 \text{ min}}{R + Z + R2 \text{ min} + R1 \text{ max}}\right) \quad \text{Equation 2}$$

If the point A becomes negative with respect to ground, W2 now rises to its maximum value R2 max and W1 falls to its minimum value R1 min. With this arrangement, the attenuation of the network becomes $$V2 = V1\left(\frac{R + R2 \text{ max}}{R + Z + R2 \text{ max} + R1 \text{ min}}\right) \quad \text{Equation 3}$$

An inspection of the equations shown above will indicate that the ratio of V2 to V1 is a maximum for Equation 3, a minimum for Equation 2 and a mean value for Equation 1.

By suitably adjusting the type of varistor and the value of R, or by adding resistors in parallel or series with the varistors to adjust the values of R min and R max as mentioned in relation to FIGURES 3b and 4b, the attenuation achieved in the network can be made complementary to the gain achieved in the triode. Under these conditions, more nearly linear amplification is achieved for all values of signal voltages within which this complementary relation holds.

With regard to obtaining the required attenuation characteristic of the network, it will be appreciated that varistors composed of different materials of different physical dimensions will produce different resistance-voltage characteristics. In addition, composite varistors may be employed which use combinations of different materials and dimensions to produce a compromise characteristic which approximates to the characteristic desired.

A circuit identical to that of FIGURE 5, to which has been added series and parallel resistors to adjust the values of R min and R max of the varistors, is shown in FIGURE 5a. Varistor W1 has a series resistor R3 and a shunt resistor R4 while W2 has a series resistor R5 and a shunt resistor R6.

In FIGURE 6, a correcting network using a symmetrical varistor W is applied to a single stage pentode amplifier where T is the pentode tube connected in the conventional grounded cathode arrangement. Rs is a screen grid dropping resistor decoupled by the capacitor Cs.

As in previous figures the input to the circuit consists of a source having voltage V1 and internal impedance Z, connected to terminals I—I. With this arrangement, for signal voltages approaching zero, the attenuation can be expressed by $$V2 = V1\left(\frac{R}{R + Z + R_0}\right) \quad \text{Equation 4}$$

where Ro is the resistance of varistor W for zero applied voltage. For signal voltages negative with respect to ground the resistance of varistor W will assume its minimum back resistance R' min and the attenuation will be $$V2 = V1\left(\frac{R}{R + Z + R' \text{ min}}\right) \quad \text{Equation 5}$$

For signal voltages positive with respect to ground, varistor W assumes its minimum resistance R min and the attenuation becomes $$V2 = V1\left(\frac{R}{R + Z + R \text{ min}}\right) \quad \text{Equation 6}$$

By selecting a symmetrical varistor having the required values of R min and R' min the relationship of the attenuation for positive signals to the attenuation for negative signals may be adjusted to be complementary to the original gain characteristic of the pentode T. Again, the required varistor characteristic may be obtained by employing different materials and various physicial dimensions or by using a composite varistor as previously suggested.

In place of the symmetrical varistor shown in FIGURE 6, two parallel, reverse connected, unsymmetrical varistors may be used as shown in FIGURE 6a.

For the circuit of FIGURE 6a Equation 4 becomes $$V2 = V1\left(\frac{R}{R+Z+\frac{R2_0 \cdot R1_0}{R2_0+R1_0}}\right) \quad \text{Equation } 4a$$

where $R1_0$ is the resistance of W1 at voltages approaching zero and $R2_0$ is the resistance of W2 at voltages approaching zero an equation similar to Equation 5, giving the attenuation when W is in its low resistance condition is $$V2 = V1\left(\frac{R}{R+Z+R1 \text{ min}}\right) \quad \text{Equation } 5a$$

The equation similar to Equation 6, giving the attenuation when W2 is in its low resistance condition, is $$V2 = V1\left(\frac{R}{R+Z+R2 \text{ min}}\right) \quad \text{Equation } 6a$$

Here again the relative attenuation for positive and negative signals can be predetermined by proper selection of R, R1 min and R2 min. The latter two resistance values may be adjusted by the connection of appropriate series or shunt resistors as shown in FIGURE 6b. This figure shows a circuit identical to that of FIGURE 6a except that the value of R1 min is increased by the addition of a resistor R4 in series with W1 while the value of R2 min is increased by the addition of resistor R3 in series with W2. Resistor R5 connected in parallel with the varistors and their series resistors may be of a value much greater than the series resistors so as not to affect substantially the resistances R1 min and R2 min and may be of the order of, or less than, $R1_0$ and $R2_0$ so as to lessen the overall impedance of the varistor network for near zero applied voltages.

FIGURE 7 shows two triodes T and T' connected in push-pull using a common autobias resistor $Rk$ decoupled by capacitor $Ck$. The push-pull load is represented by a center tapped transformer $Tx$ connected to load L. Twin attenuating circuits consist of the varistors W1 and W2 and resistors R and R1. It is well known that in a push-pull circuit such as this the overall transfer characteristic of the two tubes will be the resultant of the two individual tube characteristics. Under these conditions and with class A bias, the deviation from the ideal straight line gain characteristic of the circuit is due to the decrease of slope in the direction of negative grid swing.

The normal phase inverter input to the push-pull circuit is shown here by two voltage sources V1 and V1' and their associated internal impedances Z and Z' respectively.

For voltages approaching zero, the attenuation of T1 and T' is given by:

$$V2 = V2' = V1\left(\frac{R}{R+Z+R1_0}\right) = V1'\left(\frac{R}{R'+Z'+R2_0}\right)$$

Equation 7

For voltages making A positive with respect to A', the attenuation is given by:

$$V2 = V1\left(\frac{R}{R+Z+R1 \text{ max}}\right) \quad \text{Equation } 8$$

$$V2' = V1'\left(\frac{R'}{R'+Z'+R2 \text{ min}}\right) \quad \text{Equation } 9$$

For voltages making A' positive with respect to A, the following holds:

$$V2 = V1\left(\frac{R}{R+Z+R1 \text{ min}}\right) \quad \text{Equation } 10$$

$$V2' = V1'\left(\frac{R'}{R'+Z'+R1 \text{ max}}\right) \quad \text{Equation } 11$$

Here again the desired characteristic may be obtained by using varistors of different materials and dimensions or by the use of composite varistors. The use of series and parallel resistors to adjust the minimum and maximum resistance values of the varistors, is illustrated in FIGURE 7a. This circuit is identical to that of FIGURE 7 except that W1 is provided with a series resistor R3 and a parallel resistor R4 while varistor W2 is provided with a series resistor R5 and a parallel resistor R6.

For the condition where the tubes of the push-pull circuit illustrated in FIGURE 7 might be biased in class B conditions, the overall non-linearity would be caused by the increased slope in the direction of positive grid swing. Under these conditions, corrections can be achieved by reversing the direction of the varistors shown in FIGURE 7 with a consequent adjustment of Equations 8 to 11. Such a circuit with the varistors reversed is shown in FIGURE 7b, series and parallel resistors being provided to adjust the minimum and maximum resistance of the varistors. Other than for the reversed varistors this circuit is the same as shown in FIGURE 7b, although it will be obvious from the previous discussion that the series and parallel resistors R3 to R6 are not essential.

FIGURE 8 illustrates a circuit in which correction is applied prior to the first stage of a two stage resistance capacitance coupled amplifier of the normal type, having tubes T1 and T2 in its respective stages. The tube T1 will be working at a much lower level than T2 and consequently its distortion may be ignored in a first approximation. The 180° phase shift caused by tube T1 will cause point D on the grid of T2, to become negative when point A is positive, and vice versa. If the gain of the stage containing T1 is assumed constant and equal to G then for D approaching zero voltage the overall gain between the input and point D can be written as $$V2 = -V1\left(\frac{R+R2_0}{R+Z+R2_0+R1_0}\right)G \quad \text{Equation } 12$$

where V2 is the voltage between ground and point D.

When point C becomes positive with respect to ground, then $$V2 = -V1\left(\frac{R+R2 \text{ min}}{R+Z+R2 \text{ min}+R1 \text{ max}}\right)G$$

Equation 13

When point C becomes negative then $$V2 = -V1\left(\frac{R+R2 \text{ max}}{R+Z+R2 \text{ max}+R1 \text{ min}}\right)$$

Equation 14

Suitable adjustment of R and the minimum and maximum resistance values of W1 and W2 will therefore provide any required ratio of positive signal to negative signal gain in order to compensate for the non-linear characteristic of the tube T2. The resistance values of W1 and W2 may be adjusted by the use of series and parallel resistors as described and illustrated in the preceding embodiments.

It will be appreciated that, although the present invention has been described chiefly in relation to grounded cathode type amplifiers, this amplifier has been used only by way of illustration and that the methods described may equally well be applied to grounded grid and grounded anode amplifiers. Further, as described with reference to FIGURE 8, the correction is applicable to stages of amplification prior to the stage in which correction is desired. This applies as well to the push-pull circuits described. For example FIGURE 9 illustrates the condition where the non-linearity of a push-pull stage is corrected in a stage prior to the phase splitter. The normal push-pull circuit using tubes T2 and T3 and feeding load L through transformer $Tx$, is fed by a phase inverter stage using tube T1 in a well known manner. Here the varistors W1 and W2 correct the signal before being applied to the phase inverter T1, and are connected in parallel with each other and in series with resistor R. As point A approaches zero potential the gain of the push-pull stage will be multiplied by a factor $$\left(\frac{R}{\frac{R1_0' \cdot R2_0}{R1_0 + R2_0} + R}\right) G \qquad (15)$$

When G is the constant gain of the tube T1. When A becomes positive, this factor becomes $$\left(\frac{R}{R1 \min + R}\right) G \qquad (16)$$

and when A becomes negative the factor is $$\left(\frac{R}{R2 \min + R}\right) G \qquad (17)$$

Factors 16 and 17 will clearly give higher values of gain than will factor 15, thus compensating for the loss of gain of the push-pull stage due to non-linearities in T2 and T3.

In its method aspect, the present invention is envisaged as comprising the step of predistorting the input signal to a tube in a manner complementary to the distortion introduced into the signal by the non-linear transfer characteristic of the tube. In its apparatus aspect, the present invention comprises a circuit including non-linear impedance elements, and having an impedance characteristic complementary to the transfer characteristic of the tube to which such compensation network is to be applied.

The term complementary as used throughout this description is intended to mean that, whatever the nature and magnitude of the distortion introduced by the non-linear transfer characteristic of the vacuum tube, the impedance network compensates for such distortion by distorting the applied signal in the opposite sense and so may be considered as complementary.

A more precise way of regarding this is to define the manner in which the signal transmission circuit, which includes the vacuum tube, distorts or processes the applied signal by the transfer function of the transmission circuit, so that the impedance network will have a transfer function which is the inverse of that for the signal transmission circuit. Since the combined transfer function of two circuits in series is the product of their individual transfer functions, it will be seen that the overall effect is to render the combined system of network and transmission circuit substantially distortion free.

Though the term transfer function is now widely used particularly for computers and servo mechanisms, to remove any ambiguity it is here to be construed as indicative of the electrical function performed on the applied signal which results in the distorted output or in simpler terms it may be considered as the ratio of the output to the input at any given instant.

I claim:

1. In a signal transmission circuit including a vacuum tube having a non-linear dynamic transfer characteristic whereby to cause a signal applied to said circuit to be distorted by said circuit; apparatus for compensating for said distortion comprising an impedance network formed of interconnected two-electrode linear circuit elements and at least one two-electrode non-linear circuit element having a non-linear impedance/applied voltage characteristic; said impedance network having an output connected to said vacuum tube and an input for connection to the source of the signal to be transmitted by said transmission circuit, said network having a transfer function complementary to the transfer function of said transmission circuit.

2. A circuit as claimed in claim 1 wherein said non-linear and linear circuit elements are serially connected across said input, said output being taken across a portion of said series circuit.

3. A circuit as claimed in claim 2 wherein said series circuit includes two unsymmetrical non-linear circuit elements connected back-to-back and said output is taken across a portion of said series circuit including one of said unsymmetrical elements.

4. A circuit as claimed in claim 3 wherein said series circuit includes a resistor and said output is taken across the combination of said resistor and one of said unsymmetrical elements.

5. A circuit as claimed in claim 2 wherein said series circuit includes a symmetrical non-linear circuit element, and said output is taken across one of said linear circuit elements.

6. A circuit as claimed in claim 5 wherein said symmetrical circuit element is a symmetrical varistor.

7. A circuit as claimed in claim 2 wherein said circuit includes two unsymmetrical non-linear circuit elements reverse connected in parallel, the combination of said two elements being connected in series with a linear circuit element across said input, said output being taken across said linear circuit element.

8. A circuit as claimed in claim 7 wherein said circuit includes a linear circuit element in parallel with at least one of said unsymmetrical non-linear circuit elements.

9. A circuit as claimed in claim 7 wherein said circuit includes a linear circuit element in series wth at least one of said non-linear elements.

10. A circuit as claimed in claim 7 wherein at least one of said unsymmetrical non-linear circuit elements is a varistor.

11. A circuit as claimed in claim 7 wherein at least one of said unsymmetrical non-linear circuit elements is a thermionic diode.

References Cited in the file of this patent

UNITED STATES PATENTS

| | | |
|---|---|---|
| 1,691,147 | Clark | Nov. 13, 1928 |
| 2,111,386 | Buchmann | Mar. 15, 1938 |
| 2,137,401 | Hobbie | Nov. 22, 1938 |
| 2,156,658 | Shore | May 2, 1939 |
| 2,233,061 | Peterson | Feb. 25, 1941 |
| 2,293,628 | Reiling | Aug. 18, 1942 |
| 2,552,588 | Reeves | May 15, 1951 |
| 2,730,575 | Hayden-Pigg | Jan. 10, 1956 |
| (Corresponding to French Patent 1,043,257) | | |
| 2,768,352 | Von Sivers | Oct. 23, 1956 |
| 2,776,410 | Guanella | Jan. 1, 1957 |

FOREIGN PATENTS

| | | |
|---|---|---|
| 875,102 | France | Sept. 8, 1942 |
| 1,043,257 | France | Nov. 9, 1953 |
| 923,798 | Germany | Feb. 21, 1955 |